United States Patent
Dua et al.

(10) Patent No.: US 11,256,887 B1
(45) Date of Patent: Feb. 22, 2022

(54) MERGING RFID DATA AND BARCODE DATA

(71) Applicant: eSmart Source Inc., Concord, CA (US)

(72) Inventors: Archit Dua, Concord, CA (US); Ankit Dua, Concord, CA (US); Arpit Dua, Concord, CA (US)

(73) Assignee: eSmart Source Inc., Concord, CA (US)

( * ) Notice: Subject to any disclaimer, the term of this patent is extended or adjusted under 35 U.S.C. 154(b) by 0 days.

(21) Appl. No.: 17/034,349

(22) Filed: Sep. 28, 2020

(51) Int. Cl.
*G06K 7/10* (2006.01)
*G06K 7/14* (2006.01)

(52) U.S. Cl.
CPC ....... *G06K 7/10366* (2013.01); *G06K 7/1413* (2013.01)

(58) Field of Classification Search
CPC .......... G06K 7/10366; G06K 7/1413
USPC .......... 235/440
See application file for complete search history.

(56) References Cited

U.S. PATENT DOCUMENTS 10,853,903 B1 * 12/2020 Deshmukh ............ G06T 1/0028
2018/0083887 A1 * 3/2018 Monda .................. H04L 47/829

* cited by examiner

*Primary Examiner* — Toan C Ly
(74) *Attorney, Agent, or Firm* — Shumaker, Loop & Kenderick, LLP

(57) ABSTRACT

A system and method for linking radio frequency identification (RFID) data and barcode data. The method includes receiving the RFID data and the barcode data. The method further includes storing the RFID data and the barcode data in a device. The method further includes identifying common metadata from the RFID data and the barcode data. Further, the method includes merging the RFID data and the barcode data based upon the common metadata. The method further includes eliminating the duplicate data post the RFID data and barcode data are merged to obtain merged data. Finally, the method includes alerting a user when at least the RFID data and the barcode data is matched with the merged data.

19 Claims, 2 Drawing Sheets

MERGING RFID DATA AND BARCODE DATA

PRIORITY INFORMATION

The present application does not claim a priority from any other application.

TECHNICAL FIELD

The present subject matter described herein, in general, relates to a method for reading Radio Frequency Identification (RFID) data and barcode data.

BACKGROUND

In recent times, it has become common to use data tags to store information and collect information about an asset. There are various data tags available in the market such as Radio Frequency Identification (RFID), Near-Field Communication (NFC), two-dimensional (2D) bar code, or Quick Response (QR) code, and others. A smart device can read or scan the data tags and collect the information stored on the data tags. The data tags are used for obtaining information on the asset. An essential need for current businesses is asset tracking, inventory management, and a like. It has been observed that the most important role in asset tracking and inventory management is data handling. The conventional method has suggested many alternatives for Inventory management, Asset tracking, and a like. However, the conventional method fails to provide an efficient way of data handling.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for reading Radio Frequency Identification (RFID) data and barcode data. This summary is not intended to identify essential features of the claimed subject matter nor is it intended for use in determining or limiting the scope of the claimed subject matter.

In one embodiment, a method for reading Radio Frequency Identification (RFID) data and barcode data is disclosed. Initially, Radio Frequency Identification (RFID) data of an asset may be received from an RFID scanner scanning an asset. The RFID data may be stored in a device. Further, barcode data of the asset may be received from a barcode scanner scanning the asset. The barcode data may be stored in the device. Upon receiving the RFID data and the barcode data, common metadata may be identified from the RFID data and the barcode data. Subsequently, the RFID data and the barcode data may be merged based upon the common metadata. Further, duplicate data may be eliminated post the RFID data and barcode data are merged to obtain merged data. Furthermore, a user may be alerted when at least the RFID data and the barcode data are matched with the merged data. In one aspect, the aforementioned method for reading Radio Frequency Identification (RFID) data and barcode data may be performed by a processor using programmed instructions stored in a memory.

In another implementation, a non-transitory computer-readable medium embodying a program executable in a computing device for reading radio frequency identification (RFID) data and barcode data is disclosed. The program may comprise a program code for receiving a radio frequency identification (RFID) data of an asset from an RFID scanner scanning the asset. The RFID data may be stored in the device. Further, the program may comprise a program code for receiving barcode data of the asset from a barcode scanner scanning the asset. The barcode data may be stored in the device. Further, the program may comprise a program code for identifying common metadata from the RFID data and the barcode data. Subsequently, the program may comprise a program code for merging the RFID data and the barcode data based upon the common metadata. Further, the program may comprise a program code for eliminating duplicate data post the RFID data and barcode data are merged to obtain merged data. Finally, the program may comprise a program code for alerting a user when at least the RFID data, and the barcode data are matched with the merged data.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for reading Radio Frequency Identification (RFID) data and barcode data disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving", "identifying," "merging," "eliminating," "alerting," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for reading Radio Frequency Identification (RFID) data and barcode data associated to an asset. Example of the asset may include a product or an item. It may be noted that one or more data tags are attached to the asset. Example of the data tags include, but not limited to, Radio Frequency Identification (RFID), Near-Field Communication (NFC), two-dimensional (2D) bar code, or Quick Response (QR) code. The system receives the RFID data and the barcode data associated to an asset. It may be noted that the RFID data is derived from an RFID tag. The system also facilitates receiving barcode information by scanning the barcode tag on the asset. Furthermore, the system merges the RFID data and the barcode data to obtain merged data. The merged data is displayed locally on the device. In one aspect, a user may submit additional information about the asset in the merged data. In another aspect, the user may capture an image of the asset and link the image with the merged data.

Figure 1:
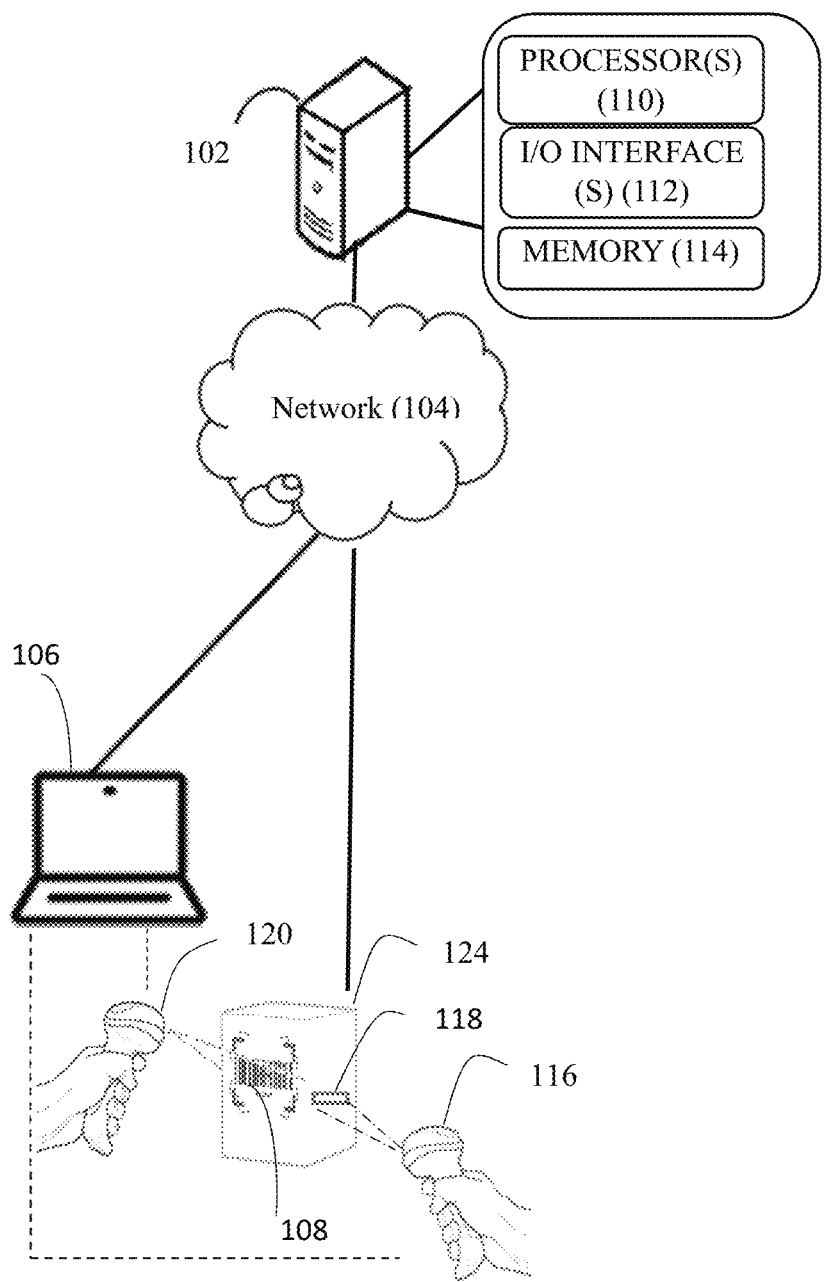
FIG. 1 illustrates a network implementation for reading Radio Frequency Identification (RFID) data and barcode data, in accordance with an embodiment of the present subject matter.

Referring now to FIG. 1, a network implementation 104 of a system 102 for reading Radio Frequency Identification (RFID) data and barcode data is disclosed. In an example, a software for reading the RFID data and the barcode data may be installed on a device 106. The system 102 may receive the RFID data and the barcode data from the device 106. Further, the system 102 may also receive an input from a user using the user devices 106.

Although the present disclosure is explained considering that the system 102 is implemented on a server, it may be understood that the system 102 may be implemented in a variety of computing systems, such as a smartphone, a tablet, a laptop computer, a desktop computer, a notebook, a workstation, a virtual environment, a mainframe computer, a server, a network server, a cloud-based computing environment. It will be understood that the system 102 may be accessed by multiple users through one or more devices 106. In one implementation, the system 102 may comprise the cloud-based computing environment in which the user may operate individual computing systems configured to execute remotely located applications. Examples of the devices 106 may include but are not limited to, a portable computer, a personal digital assistant, a handheld device, and a workstation. The devices 106 are communicatively coupled to the system 102 through a network 104.

In one implementation, the network 104 may be a wireless network, a wired network, or a combination thereof. The network 104 can be implemented as one of the different types of networks, such as an intranet, local area network (LAN), wide area network (WAN), the internet, and the like. The network 104 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 104 may include a variety of network devices, including routers, bridges, servers, computing devices, storage devices, and the like.

In one embodiment, the system 102 may include at least one processor 110, an input/output (I/O) interface 112, and a memory 114. The at least one processor 110 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 110 is configured to fetch and execute computer-readable instructions stored in the memory 114.

The I/O interface 112 may include a variety of software and hardware interfaces, for example, a web interface, a graphical user interface, and the like. The I/O interface 112 may allow the system 102 to interact with the user directly or through the devices 106. Further, the I/O interface 112 may enable the system 102 to communicate with other computing devices, such as web servers and external data servers (not shown). The I/O interface 112 can facilitate multiple communications within a wide variety of networks and protocol types, including wired networks, for example, LAN, cable, etc., and wireless networks, such as WLAN, cellular, or satellite. The I/O interface 112 may include one or more ports for connecting a number of devices to one another or to another server.

The memory 114 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 114 may include routines, programs, objects, components, data structures, etc., which perform particular tasks or implement particular abstract data types. The memory 114 may include programs or coded instructions that supplement applications and functions of the system 102. In one embodiment, the memory 114, amongst other things, serves as a repository for storing data processed, received, and generated by one or more of the programs or the coded instructions.

As there are various challenges observed in the existing art, the challenges necessitate the need to build the system 102 for reading radio frequency identification (RFID) data and barcode data. At first, a user may use the user device 106 to access the system 102 via the I/O interface 112. The user may register the devices 104 using the I/O interface 112 in order to use the system 102. In one aspect, the user may access the I/O interface 112 of the system 102. The detailed functioning of the system 102 is described below with the help of figures.

The present subject matter describes the system for reading radio frequency identification (RFID) data and barcode data. The system 102 receives the RFID data of an asset from an RFID scanner 116 scanning the asset 124. The RFID data may be stored in a device 106. It must be noted that the RFID data is derived from an RFID tag 118. The RFID scanner 116 is also called an RFID reader 116 (may also be referred as an RFID interrogator 116). The RFID scanner 116 may be one of a fixed RFID scanner and a handheld RFID scanner. In one embodiment, after scanning the RFID tag 118 the RFID data is displayed on the device 106 in real-time.

The RFID reader 116 may be fixed, handheld, portals, integrated or mobile. Further, a handheld RFID reader 116 may comprise at least a Bluetooth connectivity, a Wi-Fi connectivity, a display, a keyboard, a camera, a barcode imager, a General Packet Radio Service (GPRS), a cellular modem, a circular antenna or a linear antenna, an operating system, a single frequency or multi frequency, and a single protocol or a multi-protocol. Furthermore, a fixed RFID reader 116 may support an integrated antenna, a Wi-Fi connectivity, a Bluetooth connectivity, a GPRS, an ethernet connectivity, a Serial connectivity, a Power over Ethernet (PoE) or a Power over Ethernet Plus (PoE+), an operating system, a single frequency or multi frequency, a single protocol or a multi-protocol.

The RFID data may comprise a location of the RFID tag, colour of the RFID tag, design of the RFID tag, an attached position of the RFID tag, an RFID tag type, a memory size, an RFID tag owner, information about an affixed position, information about the asset(s) the RFID tag is affixed to, or any similar combination. In one embodiment, the information about the asset may comprise at least an asset location, an asset identification number, an asset name, an asset's owner name, a category of the asset and alike. In some embodiments, the one or more devices may record the data associated with each RFID tag in the form of audio, pictures, video, text, numbers, or any combination thereof information about the asset 124 such as name, price, location, temperature, humidity, moisture, vibration, impact status and other information about the asset 124.

Further to receiving the RFID data, the system 102 receives the barcode data of the asset 124 from a barcode scanner 120 scanning the asset 124. The barcode data may be stored in the device 106. In one embodiment, the barcode data may be displayed on the device 106 in real-time. In some embodiments, alternatives of a barcode 108 such as a QR code, an NFC tag, or a smart card may also be used. The barcode data may comprise information related to the asset 124 such as an asset name, an asset price, an asset design number, the asset identification number (the asset ID) and a like.

Further to receiving the barcode data, the system 102 identifies common metadata from the RFID data and the barcode data. The common metadata may indicate at least the asset name, the asset price, the asset ID, Global Trade Item Number (GTIN), a serial number, asset information, a common column present in the RFID data and the barcode data or a common row present in the RFID data and the barcode data.

Further to identifying, the system 102 merges the RFID data and the barcode data based upon the common metadata. It may be noted that at least one data type may be common in the RFID data and the barcode data. In one embodiment, the system gives an alert to the user when no common metadata is identified between the RFID data and the barcode data.

In an example, when the RFID data and the barcode data are received the system identifies the common metadata. In the example, the common metadata may be the asset name. Furthermore, the system merges the RFID data and the barcode data based on the common metadata (the asset name).

Further to merging, the system 102 eliminates duplicate data. It may be noted that the RFID data and the barcode data are merged to obtain merged data after eliminating the duplicate data. In one implementation, the merged data may also be obtained by linking or associating the RFID data and the barcode data. Further, the merged data is displayed on the device. In one embodiment, the merged data may be retrieved by the user from the device. In another embodiment, the user may manually submit additional information about the asset in the merged data.

In one embodiment, the merged data comprises a unique RFID value. It may be noted that the system may create the unique RFID value by merging barcode serial number data and RFID serial number data. In an example, the barcode serial number may be '12345', '56789', '45678', and the like. Further, the RFID serial number may be '00A', '00B', '00C' and the like. The system may merge the barcode serial number and the RFID serial number to create the unique RFID value '1234500A', '5678900B', '4567800C' and the like. It must be noted that the unique RFID value facilitates identification of both the RFID data and the barcode data.

In yet another embodiment, the system 102 also allows the user to capture an image of the asset and link the captured image with the merged data. Additionally, the system 102 also allows the user to obtain the geographic coordinates of the asset. In one example, a GPS sensor may be present in the RFID tag to share real time geographic coordinates of the asset. In some embodiments, a temperature sensor may be present in the RFID tag to provide the temperature of the asset at a particular time. Further, the RFID tag may comprise a set of sensors like a humidity sensor, a moisture sensor, and an impact sensor to determine the humidity and the moisture content about the asset. Similarly, the RFID tag may also have a vibration sensor to represent the real time vibration impact status of the asset.

Consider an example, the user scans the RFID tag and the barcode. The system stores the RFID data and the barcode data in the device. Further, the system identifies the common metadata present in the RFID data and the barcode data. Let us assume that the common metadata present is the asset name and the asset price. Further, the system merges the RFID data and the barcode data. It must be noted that the asset name and the asset price are duplicate data entry as it is present in the RFID tag as well as in the barcode. Further, the system automatically deletes the duplicate data or repeated data to obtain the merged data.

Further to eliminating, the system 102 alerts a user when at least the RFID data and the barcode data is matched with the merged data during a subsequent scanning of the asset. In some embodiment, the system compares the RFID data, and the barcode data scanned by the user with the merged data stored in the system. In one aspect, the system notifies the user about scanning the same asset again when the RFID data and the barcode data match with the merged data.

Figure 2:
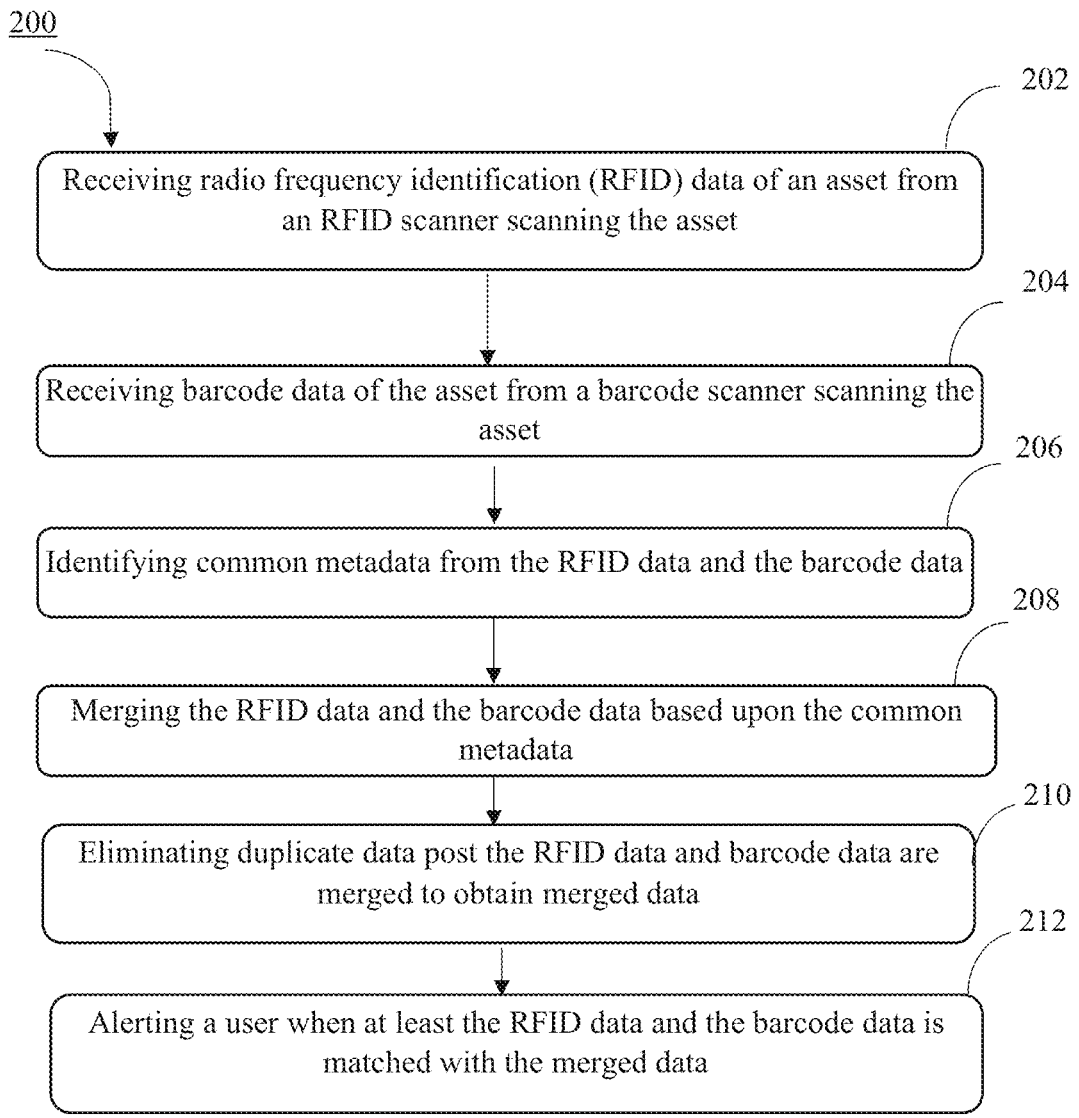
FIG. 2 illustrates a method for reading Radio Frequency Identification (RFID) data and barcode data, in accordance with an embodiment of the present subject matter.

Referring now to FIG. 2, a method 200 for reading Radio Frequency Identification (RFID) data and barcode data is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for reading the Radio Frequency Identification (RFID) data and the barcode data. Additionally, individual blocks may be deleted from the method 200 without departing from the scope of the subject matter described herein. Furthermore, the method 200 for reading the RFID data and the barcode data can be implemented in any suitable hardware, software, firmware, or combination thereof. However, for ease of explanation, in the embodiments described below, the method 200 may be considered to be implemented in the above-described system 102.

At block 202, the Radio Frequency Identification (RFID) data of an asset may be received from an RFID scanner scanning the asset. Further, the RFID data may be stored in the device 106. It must be noted that the RFID data is derived from the RFID tag.

At block 204, barcode data of the asset may be received from a barcode scanner scanning the asset. Further, the barcode data may be stored in the device.

At block 206, common metadata from the RFID data and the barcode data may be identified.

At block 208, the RFID data and the barcode data may be merged based upon the common metadata.

At block 210, duplicate data may be eliminated post the RFID data and barcode data are merged to obtain merged data. The merged data may be stored in the device. Further, the merged data of the asset may be displayed on the device. In one embodiment, a user can retrieve the merged data from the device. In another embodiment, a user may manually submit additional information of the asset in the merged data. Further, the captured image of the asset may be displayed on the device.

At block 212, a user may be alerted when at least the RFID data and the barcode data is matched with the merged data.

Exemplary embodiments discussed above may provide certain advantages. Though not required to practice aspects of the disclosure, these advantages may include those provided by the following features.

In some embodiments, the user already has the barcode data in the system. The user scans the RFID tag to obtain the RFID data and the system merges the RFID data and the barcode data.

Some embodiments of system and method facilitate the user to enter missing information of the asset in the merged data.

Some embodiments of system and method facilitate the user to scan the RFID tag and the barcode with one scanner only.

Some embodiments of system and method facilitate the user to merge the RFID data and the barcode data in offline mode.

Some embodiments of system and method facilitate the user to retrieve the merged data in offline mode.

Although implementations for methods and system for reading Radio Frequency Identification (RFID) data and barcode data have been described in language specific to structural features and/or methods, it is to be understood that the appended claims are not necessarily limited to the specific features or methods described. Rather, the specific features and methods are disclosed as examples of implementations for reading Radio Frequency Identification (RFID) data and barcode data.

The invention claimed is:

1. A method for reading radio frequency identification (RFID) data and barcode data, the method comprising:
    receiving, by a processor, Radio Frequency Identification (RFID) data of an asset from an RFID scanner scanning the asset, wherein the RFID data is stored in a device;
    receiving, by the processor, barcode data of the asset from a barcode scanner scanning the asset, wherein the barcode data is stored in the device;
    identifying, by the processor, common metadata from the RFID data and the barcode data;
    merging, by the processor, the RFID data and the barcode data based upon the common metadata;
    eliminating, by the processor, duplicate data post the RFID data and barcode data are merged to obtain merged data; and
    alerting, by the processor, a user when at least the RFID data and the barcode data is matched with the merged data during a subsequent scanning of the asset.

2. The method as claimed in claim 1, wherein the common metadata indicates at least an asset name, an asset price, an asset information, an asset ID, a Global Trade Item Number (GTIN), a serial number, common column present in the RFID data and the barcode data or common row present in the RFID data and the barcode data.

3. The method as claimed in claim 1, wherein a set of sensors are attached to an RFID tag, and wherein the RFID data is derived from the RFID tag, and wherein the set of sensors comprises at least a temperature sensor, a humidity sensor, a moisture sensor, a vibration sensor, and an impact sensor.

4. The method as claimed in claim 1, further comprises displaying the merged data of the asset.

5. The method as claimed in claim 1, further comprises retrieving the merged data from the device.

6. The method as claimed in claim 1, further comprises allowing the user to manually submit additional information of the asset in the merged data.

7. The method as claimed in claim 1, further comprises allowing the user to capture an image of the asset.

8. The method as claimed in claim 1, further comprises displaying the captured image of the asset on a display.

9. The method as claimed in claim 1, further comprises allowing a user to obtain the geographic coordinates of the asset.

10. A system for reading Radio Frequency Identification (RFID) data and barcode data, the system comprising:
    a memory; and
    a processor coupled to the memory, wherein the processor is configured to execute program instructions stored in the memory for:
        receiving Radio Frequency Identification (RFID) data of an asset from an RFID scanner scanning the asset, wherein the RFID data is stored in a device;
        receiving barcode data of the asset from a barcode scanner scanning the asset, wherein the barcode data is stored in the device;
        identifying common metadata from the RFID data and the barcode data;
        merging the RFID data and the barcode data based upon the common metadata;
        eliminating duplicate data post the RFID data and barcode data are merged to obtain merged data; and
        alerting a user when at least the RFID data and the barcode data is matched with the merged data during a subsequent scanning of the asset.

11. The system as claimed in claim 10, wherein the common metadata indicates at least an asset name, an asset price, an asset information, an asset ID, a Global Trade Item Number (GTIN), a serial number, common column present in the RFID data and the barcode data or common row present in the RFID data and the barcode data.

12. The system as claimed in claim 10, wherein a set of sensors are attached to an RFID tag, and wherein the RFID data is derived from the RFID tag, and wherein the set of sensors comprises a temperature sensor, a humidity sensor, a moisture sensor, a vibration sensor, an impact sensor.

13. The system as claimed in claim 10, further comprises displaying the merged data of the asset.

14. The system as claimed in claim 10, further comprises retrieving the merged data from a mobile electronic device.

15. The system as claimed in claim 10, further comprises allowing the user to manually submit additional information of the asset in the merged data.

16. The system as claimed in claim 10, further comprises allowing the user to capture an image of the asset.

17. The system as claimed in claim 10, further comprises displaying the captured image of the asset on a display.

18. The system as claimed in claim 10, further comprises allowing a user to obtain the geographic coordinates of the asset.

19. A non-transitory computer program product having embodied thereon a computer program for reading Radio Frequency Identification (RFID) data and barcode data, the computer program product storing instructions, the instructions comprising instructions for:
- receiving Radio Frequency Identification (RFID) data of an asset from an RFID scanner scanning the asset, wherein the RFID data is stored in a device;
- receiving barcode data of the asset from a barcode scanner scanning the asset, wherein the barcode data is stored in the device;
- identifying common metadata from the RFID data and the barcode data;
- merging the RFID data and the barcode data based upon the common metadata;
- eliminating duplicate data post the RFID data and barcode data are merged to obtain merged data; and
- alerting a user when at least the RFID data and the barcode data is matched with the merged data during a subsequent scanning of the asset.

\* \* \* \* \*